United States Patent

Beaudoin et al.

[11] Patent Number: 5,902,938
[45] Date of Patent: May 11, 1999

[54] EXPLOSIVE FLUID METERING APPARATUS HAVING IMMUNE DATA CONVERTER AND METHOD OF METERING EXPLOSIVE FLUID DISTRIBUTION

[75] Inventors: Benoit Beaudoin, Newport, Vt.; Pierre Biron, Bromptonvile, Canada

[73] Assignee: Management and Report Technologies, Inc., Ft. Myers, Fla.

[21] Appl. No.: 08/840,571

[22] Filed: Apr. 21, 1997

[51] Int. Cl.$^6$ .................................................. G01F 1/06
[52] U.S. Cl. ......................................................... 73/861.77
[58] Field of Search ........................... 73/861.77, 861.78, 73/861.79

[56] References Cited

U.S. PATENT DOCUMENTS

| | | |
|---|---|---|
| 3,230,767 | 1/1966 | Heigl et al. ............................ 73/861.77 |
| 3,662,924 | 5/1972 | Crandall et al. . |
| 3,729,996 | 5/1973 | Metz ...................................... 73/861.77 |
| 3,821,896 | 7/1974 | Grob ...................................... 73/861.77 |
| 3,873,814 | 3/1975 | Mirdadian ............................. 73/861.77 |
| 4,067,061 | 1/1978 | Juhasz . |
| 4,172,381 | 10/1979 | Aigner . |
| 4,195,522 | 4/1980 | Anderson et al. .................... 73/861.79 |
| 4,223,217 | 9/1980 | Bongard et al. . |
| 4,249,794 | 2/1981 | Haley . |
| 4,313,168 | 1/1982 | Stephens et al. . |
| 4,556,280 | 12/1985 | Bagby . |
| 4,655,370 | 4/1987 | Harrison ............................... 73/861.77 |
| 4,658,371 | 4/1987 | Walsh et al. . |
| 4,658,832 | 4/1987 | Brugnolli ............................. 73/861.77 |
| 4,882,499 | 11/1989 | Luukkala et al. . |
| 4,885,943 | 12/1989 | Tootell et al. . |
| 4,887,469 | 12/1989 | Shoptaw . |
| 4,891,990 | 1/1990 | Khalifa et al. . |
| 4,897,642 | 1/1990 | DiLullo et al. . |
| 4,936,151 | 6/1990 | Tokoi .................................... 73/861.77 |
| 5,065,003 | 11/1991 | Wakatsuki et al. . |
| 5,129,025 | 7/1992 | Loftus et al. . |
| 5,154,314 | 10/1992 | Van Wormer . |
| 5,204,819 | 4/1993 | Ryan . |
| 5,228,469 | 7/1993 | Otten et al. . |
| 5,359,522 | 10/1994 | Ryan . |
| 5,420,797 | 5/1995 | Burns . |
| 5,541,398 | 7/1996 | Hanson . |
| 5,542,302 | 8/1996 | McMillan et al. ................... 73/861.77 |
| 5,550,738 | 8/1996 | Bailey et al. . |
| 5,579,233 | 11/1996 | Burns . |
| 5,700,999 | 12/1997 | Streicher et al. ...................... 235/381 |

FOREIGN PATENT DOCUMENTS

| | | | |
|---|---|---|---|
| DT2630149A1 | 1/1977 | Germany ........................... 73/861.77 |
| 0000620 | 1/1984 | Japan ................................. 73/861.77 |

*Primary Examiner*—Harshad Patel
*Attorney, Agent, or Firm*—Allen, Dyer, Doppelt, Milbrath & Gilchrist, P.A.

[57] ABSTRACT

An apparatus and methods are provided for metering explosive fluid. The apparatus preferably has an explosive fluid distribution pipe for distributing explosive fluid and an explosive fluid meter in fluid communication with the explosive fluid delivery pipe. The explosive fluid meter preferably includes a housing and an explosive fluid metering device positioned within the housing for metering explosive fluid. The explosive fluid metering device includes a rotatably mounted shaft rotatable responsive to explosive fluid being distributed from the explosive fluid distribution pipe. An immune data converter is positioned within the housing of the explosive fluid meter and is connected to the rotatably mounted shaft for converting the rotation of the shaft into optical data communication.

20 Claims, 4 Drawing Sheets

Fig. 1.

EXPLOSIVE FLUID METERING APPARATUS HAVING IMMUNE DATA CONVERTER AND METHOD OF METERING EXPLOSIVE FLUID DISTRIBUTION

FIELD OF THE INVENTION

The present invention relates to the explosive fluid distribution industry and, more particularly, to the field of explosive fluid metering.

BACKGROUND OF THE INVENTION

Over the years, explosive fluid distribution, e.g., petroleum based fuels, chemicals, gases, has expanded nationally and internationally so that trucks, trains, boats, and various other transportation systems transport explosive fluid to and from explosive fluid distribution centers and customers. For example, one problem that continues to remain with fuel distribution systems, however, is that because various fuels are combustible the fuel distribution environments remain potentially explosive. This potential explosiveness, for example, can result from explosive fluid fumes, explosive fluid residue, or the explosive fluid itself igniting when exposed to electric sparks or intense heat. Accordingly, to address this risk, the explosive fluid distribution industry has designed systems over the years to be primarily mechanical in nature and to be heavily insulated from potentially explosive scenarios.

Nevertheless, like many other industries, the explosive fluid or fuel distribution industries also have a need to be automated so that explosive fluid or fuel distribution can more accurately be planned, tracked, and controlled. If electric components are added to explosive fluid distribution systems, however, electric sparks are always a potential occurrence which many companies do not want to risk. Adding heavily insulated electrical equipment to an existing explosive fluid distribution system such as a fuel meter, however, can be expensive, complex, and quite burdensome to existing fuel meter owners. Also, the noise and other interference from an industrial environment can make tracking and controlling these systems difficult.

SUMMARY OF THE INVENTION

With the foregoing in mind, the present invention advantageously provides an apparatus and method for readily retrofitting an existing explosive fluid meter for providing communication representative of explosive fluid metering data which inhibits explosive conditions. An apparatus and method of the present invention advantageously converts an explosive fluid meter for data communication so that the explosive fluid meter can readily be controlled and the distribution of explosive fluid readily tracked without jeopardizing the existing integrity of an explosive fluid meter in inhibiting explosions or the igniting of the explosive fluid. An apparatus and method of the present invention also advantageously provides an explosive fluid meter having data communication capabilities so that interference with data communications to and from the explosive fluid meter is greatly inhibited.

More particularly, an explosive fluid metering apparatus for metering explosive fluid is provided according to the present invention. The apparatus preferably has an explosive fluid distribution pipe for distributing explosive fluid and an explosive fluid meter in fluid communication with the explosive fluid delivery pipe. The explosive fluid meter includes a housing and explosive fluid metering means positioned within the housing for metering explosive fluid. The explosive fluid metering means includes a rotatably mounted shaft rotatable responsive to explosive fluid being distributed from the explosive fluid distribution pipe. Immune data converting means is positioned within the housing of the explosive fluid meter and connected to the rotatably mounted shaft for converting the rotation of the shaft into data communication which is immune from electromagnetic emission interferences and inhibits combustibility of the explosive fluid.

An explosive fluid metering immune data converting apparatus according to the present invention is adapted to be positioned within a housing of an explosive fluid meter and to be responsive to a rotatable shaft positioned within the housing for converting the rotation of the shaft into data communication. The immune data converting apparatus preferably includes a rotatable disc member adapted to be mounted to the shaft. The rotatable disc member has a hub adapted to be mounted to the shaft and a plate member connected to the hub and extending outwardly therefrom. The plate member preferably includes a plurality of indicators formed in a surface thereof. The immune data converting apparatus also includes a pair of spaced-apart light pipes positioned so that the indicators of the plate member extend between the pair of spaced-apart light pipes so that optical pulses are formed during rotation of the shaft and the rotatable disc member connected thereto.

The present invention also advantageously includes methods of metering explosive fluid. A method of metering explosive fluid according to the present invention preferably includes connecting an explosive fluid meter in fluid communication with an explosive fluid distribution pipe. The explosive fluid meter has a housing and explosive fluid metering means positioned within the housing for metering explosive fluid. The explosive fluid metering means includes a rotatable shaft. The method also includes mounting an immune data converter to the rotatable shaft, rotating the shaft responsive to explosive fluid being distributed from the explosive fluid distribution pipe, and converting the rotation of the shaft into optical data communication representative of the amount of explosive fluid being distributed.

A method of converting the rotation of a shaft of explosive fluid meter into optical communication according to the present invention preferably includes mounting a rotatable disc member to the shaft. The rotatable disc member has a hub for mounting the disc member to the shaft and a plate member connected to the hub and extending outwardly therefrom. The plate member has a plurality of indicators formed in a surface thereof. The method also includes mounting a pair of spaced-apart light pipes positioned so that the indicators of the plate member extend between the pair of spaced-apart light pipes and so that optical pulses are formed during rotation of the shaft and the rotatable disc member connected thereto.

A method of converting an explosive fluid meter for optical communication is also provided according to the present invention. The method preferably includes opening a housing of an explosive fluid meter and mounting an immune data converter to a rotatable shaft positioned within the housing of the explosive fluid meter. The rotation of the shaft is converted into optical data communication representative of the amount of explosive fluid being distributed.

Because the explosive fluid metering apparatus and methods of the present invention advantageously use optical communication which does not include any electrical components which can potentially ignite explosive fluid fumes, explosive fluid residue, or explosive fluid itself, the integrity of an explosive fluid metering system is maintained so that the system continues to effectively inhibits explosions or fires. An explosive fluid metering apparatus and methods of the present invention advantageously is relatively inexpensive, relatively easy to manufacture and install, and less complicated than other systems. Also, because the data communication, e.g., optical or fluid, is immune from electro-mechanical interferences, the accuracy of the data communication related to the explosive fluid meter is greatly enhanced.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION

The present invention will now be described more fully hereinafter with reference to the accompanying drawings which illustrated preferred embodiments of the invention. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and/or double prime notation when used indicate similar elements in alternative embodiments.

Figure 1:
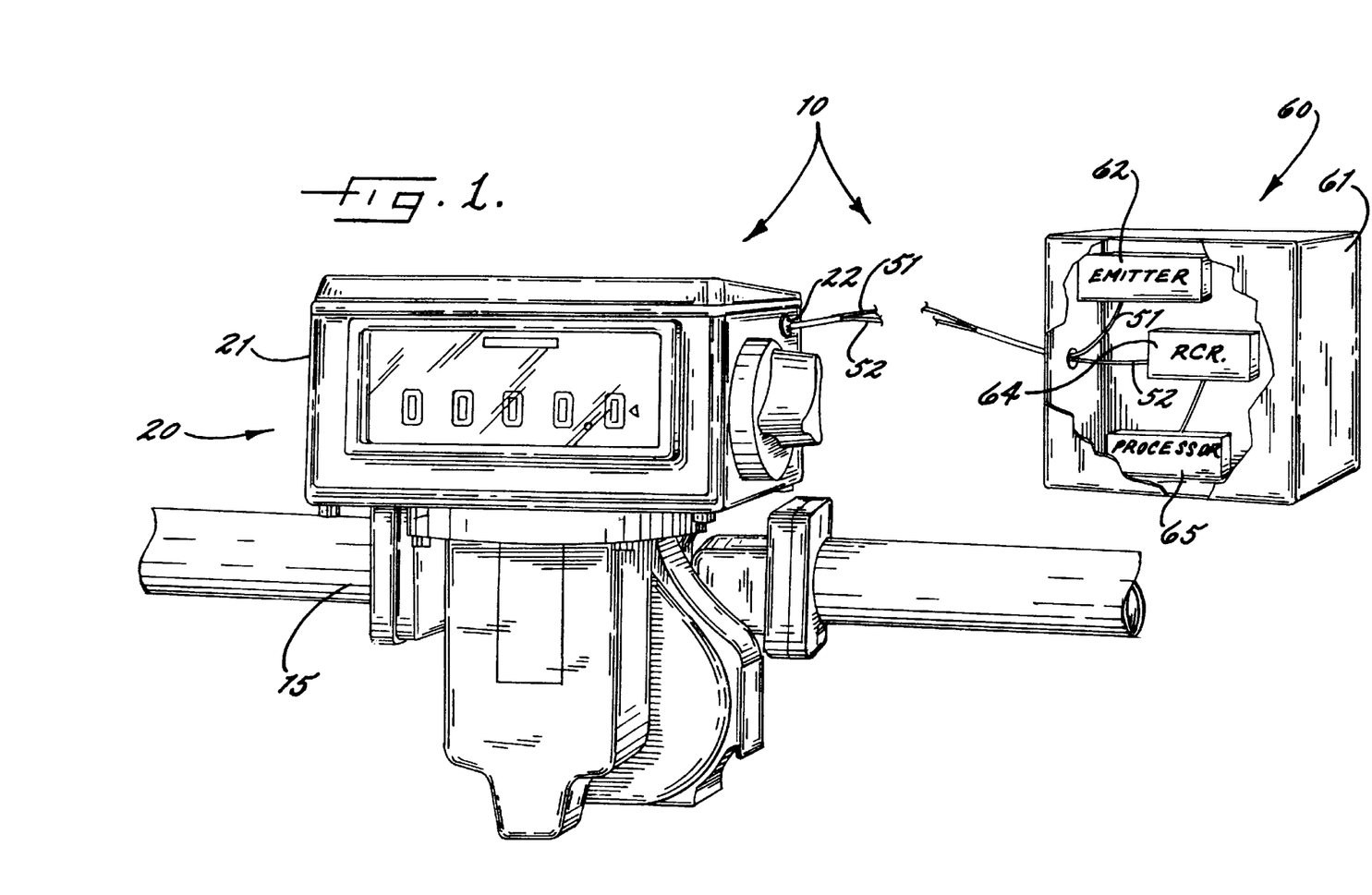
FIG. 1 is a perspective view of an explosive fluid metering apparatus for metering explosive fluid according to an embodiment of the present invention.
Figure 2:
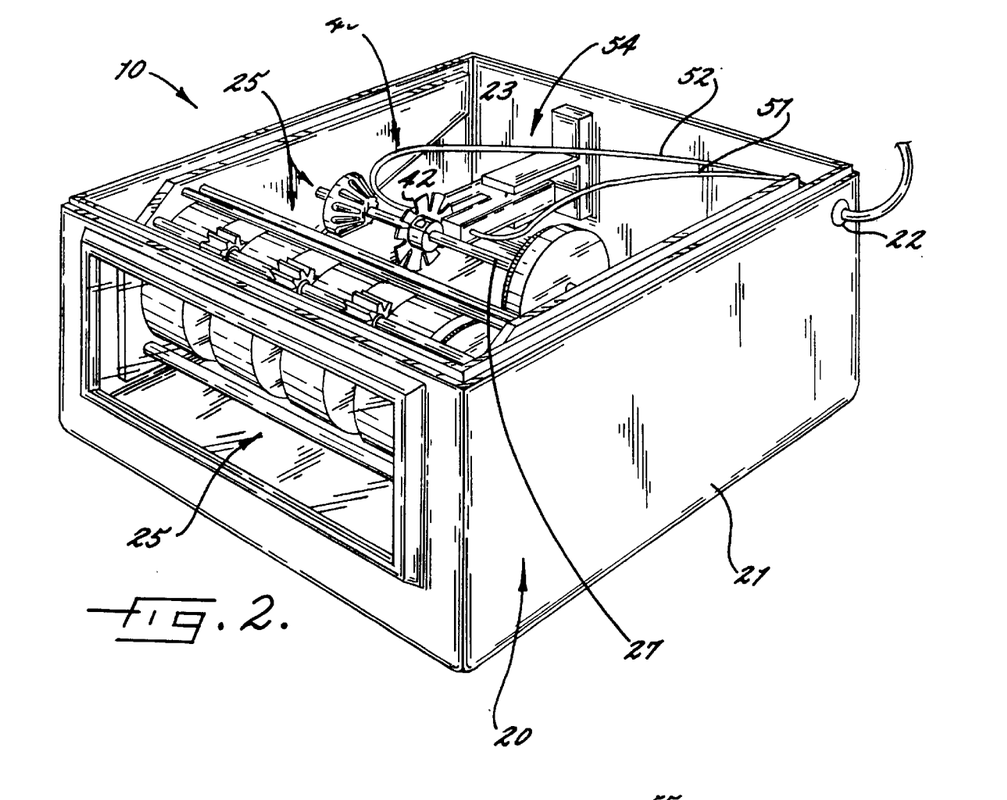
FIG. 2 is a perspective view of an explosive fluid metering apparatus having a cover of a meter removed therefrom according to an embodiment of the present invention.
Figure 3:
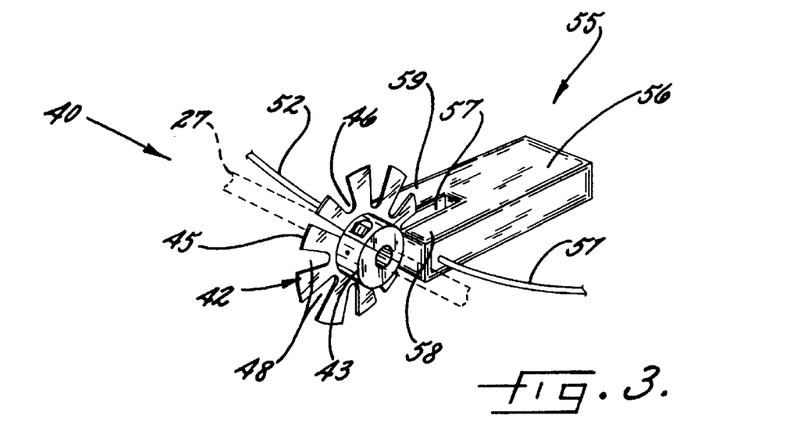
FIG. 3 is a perspective view of an immune data converter of an explosive fluid metering apparatus according to an embodiment of the present invention.

FIGS. 1–2 illustrate an explosive fluid metering apparatus 10 for metering explosive fluid, e.g., petroleum based fuels, chemicals, gases, according to the present invention. The explosive fluid metering apparatus 10 preferably has an explosive fluid distribution pipe 15 for distributing explosive fluid and an explosive fluid meter 20 in fluid communication with the explosive fluid delivery pipe 15. The explosive fluid meter 20 includes a housing 21 and explosive fluid metering means 25 positioned within the housing 21 for metering explosive fluid being distributed by or from the explosive fluid distribution pipe 15. As understood by those skilled in the art, various models and types of explosive fluid meters, and particularly explosive fluid meters for petroleum based fuels, can be used according to the present invention.

The explosive fluid metering means 25 preferably includes at least a rotatably mounted shaft 27 or other rotator, e.g., gear, wheel, hub, or belt, rotatable responsive to explosive fluid being distributed from the explosive fluid distribution pipe 15. As understood by those skilled in the art, however, the explosive fluid metering means 25 as illustrated can also include a display, gears, belts, and/or other shafts which operate responsive to either the explosive fluid being distributed or to other portions of the explosive fluid metering means which operate in some relationship to the explosive fluid being distributed. It is important to recognize that these other portions or components of the explosive fluid metering means 25 likewise preferably do not include electric components or motors which can cause explosive fluid, explosive fluid fumes, or explosive fluid residue to ignite.

The explosive fluid metering apparatus 10 also advantageously has immune data converting means 40 positioned within the housing 21 of the explosive fluid meter 20 and responsive to the rotations of the rotatably mounted shaft 27 or other structure, e.g., a gear, rod, or wheel, which rotates or moves responsive to fluid being distributed or tracked by the meter for converting the rotation of the shaft 27 or other moving structure into immune data communications. The immune data converting means 40 advantageously converts the mechanical motion of the explosive fluid metering means 25 to data communications, e.g., optical or fluid, which is immune from electromagnetic interferences and inhibits explosions initiated within the housing 21.

With the optical or fluid data communication capability, the apparatus 10 has the capability to more accurately track and communicate information about explosive fluid usage, explosive fluid distribution, flow rates, flow pressure such as based upon tables or other calculations, or other explosive fluid regulating processes. Also, because the optical communication is immune from electro-mechanical interferences, the accuracy of the data communication related to the explosive fluid metering apparatus 10 is greatly enhanced.

As best illustrated in FIGS. 3–6 and 8–9, the immune data converting means 40, e.g., an immune data converter, according to the present invention preferably includes a rotatable disc member 42 having a hub 43 detachably mounted to the shaft 27 and a plate member 45 connected to the hub and extending outwardly therefrom. The plate member 45 includes a plurality of indicators 46, e.g., undulations, openings, apertures, slots, markings, reflections, shading, or coloring, formed in or positioned on a surface of the plate member 45. The indicators 46 in a surface of the plate member 45 of the rotatable disc member 42 preferably are a plurality of open ended slots 48 formed in the plate member 45 and extending inwardly from outer peripheries thereof. It will be understood by those skilled in the art that other types of indicators 46, such as openings or apertures, shades of light, or the like, in or on a plate member 45 can be used as well according to the present invention. Nevertheless, the indicators 46 as illustrated form a simple method of counting or tracking the rotation of the shaft 27. Accordingly, the numbering of the indicators 46 should correspond to the metering of the explosive fluid being distributed so that digital metering type operations are provided as an output to the immune data converting means 40 of the explosive fluid metering apparatus 10.

A pair of spaced-apart light pipes 51, 52 is positioned so that the indicators 46 of the plate member 45 extend between the pair of spaced-apart light pipes 51, 52 so that the optical pulses are formed during rotation of the shaft 27 and the rotatable disc member 42 connected thereto. The light pipes 51, 52 preferably are either plastic or glass fiber optic strands positioned in protective sleeves or conduits for transferring light to and from the rotating disc member 42 to sense the presence or absence of the indicators 46. The pair of light pipes 51, 52 can also be positioned together into a conduit or sleeve for ease of handling and to inhibit damage to the light pipes 51, 52.

Although the drawings of the explosive fluid metering apparatus 10 illustrate a pair of light pipes 51, 52 which can be advantageously mounted and arranged as shown, it will be understood by those skilled in the art that the pair of light pipes 51, 52 also can be either a single light pipe or a plurality of light pipes having various configurations according to the present invention. For example, a single light pipe can detect markings, shading, coloring, apertures, or other indicators positioned on the shaft 27 or other moving structures within the meter housing which rotate or move responsive to fluid being distributed or metered as understood by those skilled in the art. It will be further understood by those skilled in the art that the optical converting means 40 does not need to be mounted to the inner surface of a wall, bottom, or cover of the meter 20, but can merely be positioned within the housing 21 so as to detect movement.

The immune data converting means 40 also has light pipe mounting means 54 connected to each of the pair of light pipes 51, 52 for mounting the pair of light pipes 51, 52 in a spaced-apart arrangement. The light pipe mounting means 54 includes at least one mounting bracket 55, and preferably first and second mounting brackets 55, 75 as illustrated, connected to an inner surface of a wall of the housing 21. The at least one mounting bracket 55 includes a bracket body 56 and an elongate slot 57 having an open end thereof formed in the bracket body 56.

The pair of spaced-apart light pipes 51, 52 is connected to opposing sides of the elongate slot 57 and, more particularly, along first and second body extension portions 58, 59. Each of the first and second body extension portions 58, 59 preferably have an opening formed therein and extending therethrough. The respective pair of light pipes 51, 52 are positioned into the openings for connecting to or abuttingly engaging the first and second body extension portions 58, 59. The elongate slot 57 is positioned so that the indicators 46 of the plate member 45 of the rotatable disc member extend through at least portions of the slot 57 and so that the pair of spaced-apart light pipes 51, 52 sense the presence and absence of the indicators 46 during rotation of the shaft 27.

Figures 4, 5, 6:
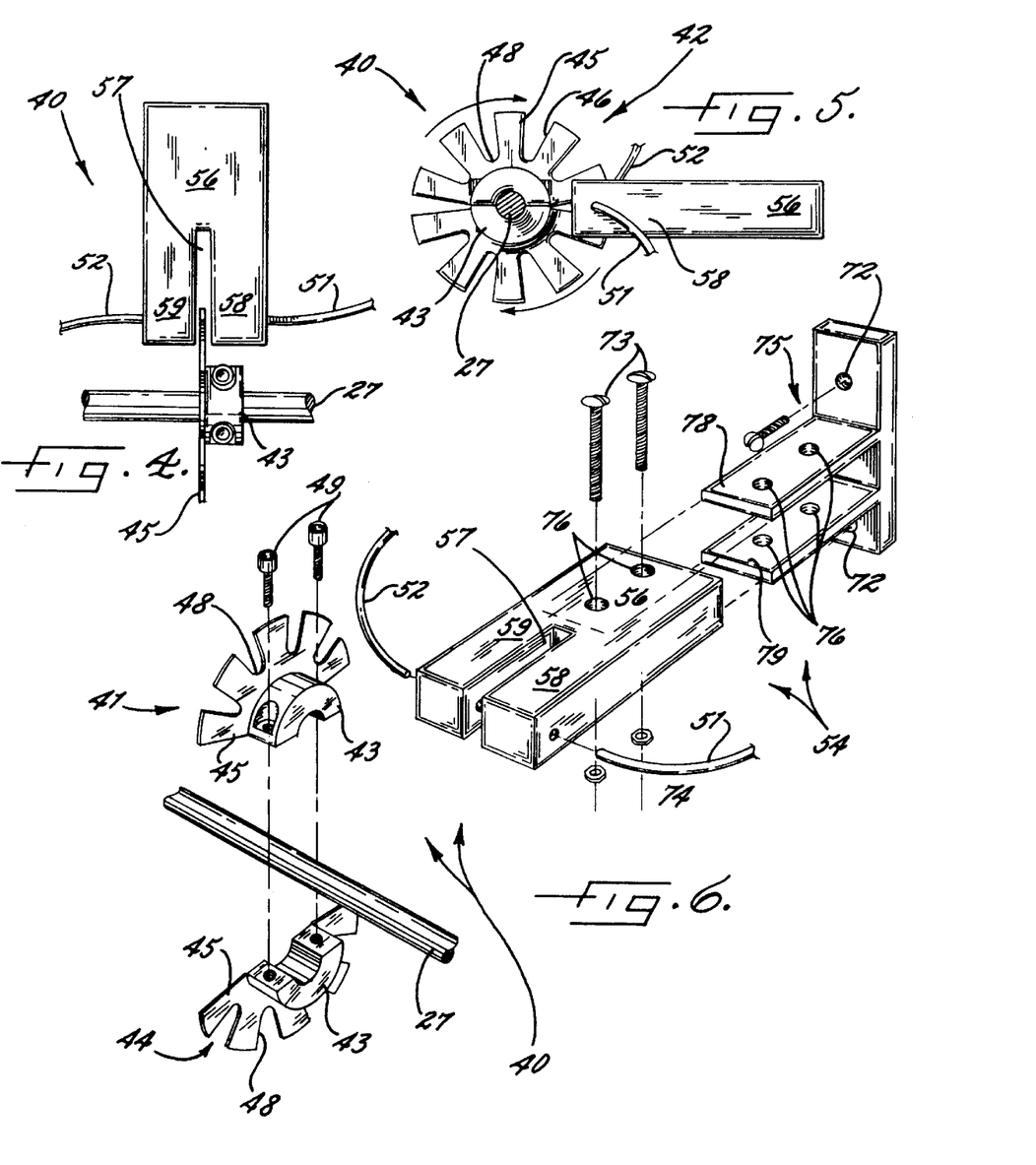
FIG. 4 is a top plan view of an immune data converter mounted to a shaft of an explosive fluid metering apparatus according to an embodiment of the present invention.
FIG. 5 is a side elevational view of an immune data converter mounted to a shaft of an explosive fluid metering apparatus according to an embodiment of the present invention.
FIG. 6 is an exploded perspective view of an immune data converter mounted to a shaft and a housing of an explosive fluid metering apparatus according to an embodiment of the present invention.

As illustrated in FIGS. 2 and 6, the second mounting bracket 75 of the light pipe mounting means 54 detachably connects to the first mounting bracket 55 by a pair of threaded bolts or screws 73 and nuts 74 as the bolts 73 extend through openings 76 in the bracket body 56 of the first mounting bracket 55. The second mounting bracket 75 preferably attaches to an inner wall 23 of the housing 21 either by an adhesive material or by fasteners such as threaded bolts or screws through openings 72 in the second mounting bracket 75. As illustrated, the second mounting bracket 75 also has first and second body extension members 78, 79 for engaging the bracket body 56 of the first mounting bracket 55 so that openings 76 in the respective mounting brackets 55, 75 positionally align. The light pipe mounting means 54 advantageously provides a simple structure for mounting the light pipes 51, 52 within the housing 21 of the explosive fluid meter 20. The light pipe mounting means 54 can thereby be positioned at various locations within the housing, e.g., various walls or surfaces, to adjust for the positional location of the rotating shaft 27.

The immune data converter 40 of the apparatus 10, for example, provides a means for readily retrofitting an existing explosive fluid meter for providing optical communication representative of explosive fluid metering data. The immune data converter 40 advantageously converts an explosive fluid meter 20 to optical communication so that the explosive fluid meter 20 can readily be controlled and the distribution of explosive fluid readily tracked without jeopardizing the existing integrity of the explosive fluid meter 20 in inhibiting explosions or the igniting of the explosive fluid. Although the immune data converter 40 is illustrated using a pair of light pipes 51, 52, it will also be understood by those skilled in the art that other immune data sensing arrangements such as using only one light pipe if enough lighting exists within the housing 21 can be used as well according to the present invention. Nevertheless, the pair of light pipes 51, 52 advantageously provides a path or passage way for passing light into the housing 21 and for taking light away from the housing 21 as understood by those skilled in the art.

As illustrated in FIG. 6, to advantageously assist and enhance the retrofitting process, the rotatable disc member 42 has first and second disc member portions 41, 44 and at least one fastener, e.g., a pair of threaded bolts or screws 49, for detachably connecting the first disc member portion 41 to the second disc member portion 44 so that the rotatable disc member 42 is detachably connected to the rotatable shaft 27. The first and second disc member portions 41, 44 preferably form first and second halves of the rotatable disc member 42. Each of the first and second halves includes a half portion of the hub 43 and a half portion of the plate member 45 so that the joining of the first and second halves respectively define the hub 43 and the plate member 45.

Each of the plate member 45 and the hub 43 of the rotatable disc member 42 has a generally circular shape. The hub 43 is connected to a medial portion of the plate member 45 as illustrated. Each of the first and second halves of the hub 43 preferably includes a semi-circular shaped groove arranged to be positioned on a circularly-shaped shaft 27 so that when the first and second halves of the hub 43 are joined together on the shaft 27 the hub 43 substantially surrounds the shaft 27. The groove is preferably machined or shape to conform to the outer circumferential-shape of the shaft 27. It will be recognized by those skilled in the art that various other shapes, e.g., rectangular, oval, or custom, can be formed in the hub 43 or other portions of the disc member 42 so as to make the immune converting means 40 readily retrofitable with existing explosive fluid or fuel distribution meters 20.

The housing 21 of the explosive fluid meter 20 preferably has a light pipe opening 22 (see FIGS. 1–2). The pair of spaced-apart light pipes 51, 52 of the immune data converting means 40 have the respective distal ends thereof positioned adjacent the rotatable disc member 42 within the housing 21 and have more proximal portions thereof extending through the light pipe opening 22 so that optical pulses responsive to the indicators 46 are communicated remote from the housing 21 of the explosive fluid meter 20. The light pipe opening 22 preferably has a light pipe fitting member positioned in the opening so that the pair of light pipes 51, 52 can be held securely to the opening without extensive slippage. It will also be understood by those skilled in the art that the light pipe opening 22 can either be specifically formed in the housing 21, e.g., drilled, or can be an existing location of an opening or passage for extending the light pipes 51, 52 therethrough.

As illustrated in FIG. 1, immune data controlling means 60, e.g., an optical controller, is positioned remote from the explosive fluid meter housing 21 and connected to the pair of light pipes 51, 52 for controlling the optical communication to and from the pair of light pipes 51, 52. The immune data controlling means 60 preferably includes an optical emitter 62 positioned in optical communication with one of the pair of light pipes 51, 52 for emitting light through the one of the pair of light pipes 51, 52. As understood by those skilled in the art, the optical emitter can be a light emitting diode, a laser diode, or other optical emitting source coupled to the one of the pair of light pipes 51, 52. An optical receiver 64 preferably is positioned in communication with the other of the pair of light pipes 51, 52 for receiving light therefrom. Also as understood by those skilled in the art, the optical receiver 64 can include a photodiode, a phototransistor, or other optical receiving transducers which receive optical pulses or degrees of presence and/or absence of light to thereby emit an electrical signal responsive to the presence or absence of light. The optical emitter 62 and optical receiver 64 preferably are positioned in a housing 61 positioned remote from the meter 20.

The immune data controlling means 60 also preferably includes processing means 65 is positioned in communication with at least the optical receiver 64 for processing the optical communication received from at least the other of the pair of light pipes 51, 52. The processing means 65 preferably is a microprocessor, a processing or controlling circuit, a plurality of processors, or other circuits or software which condition and transform the received optical pulses into data communication signals representative of the presence or absence of light. This processing means 65 advantageously counts and/or tracks the presence or absence of light so that the analog metering means is readily converted to digital data communication metering signals. It will also be understood by those skilled in the art that the processing means 65 can also be connected to the optical emitter 62 for processing electrical signals to be emitted by the optical emitter 62. Once the optical communication is advantageously outside of the explosive fluid meter housing 21 in a manner which greatly inhibits or eliminates the possibility of the optical converting means causing igniting of explosive fluid, explosive fluid fumes, or explosive fluid residue as illustrated in FIG. 1, the optical communication can be transmitted or communicated to a data collection device or computer for analyzing the optical communication.

Figures 7, 8, 9:
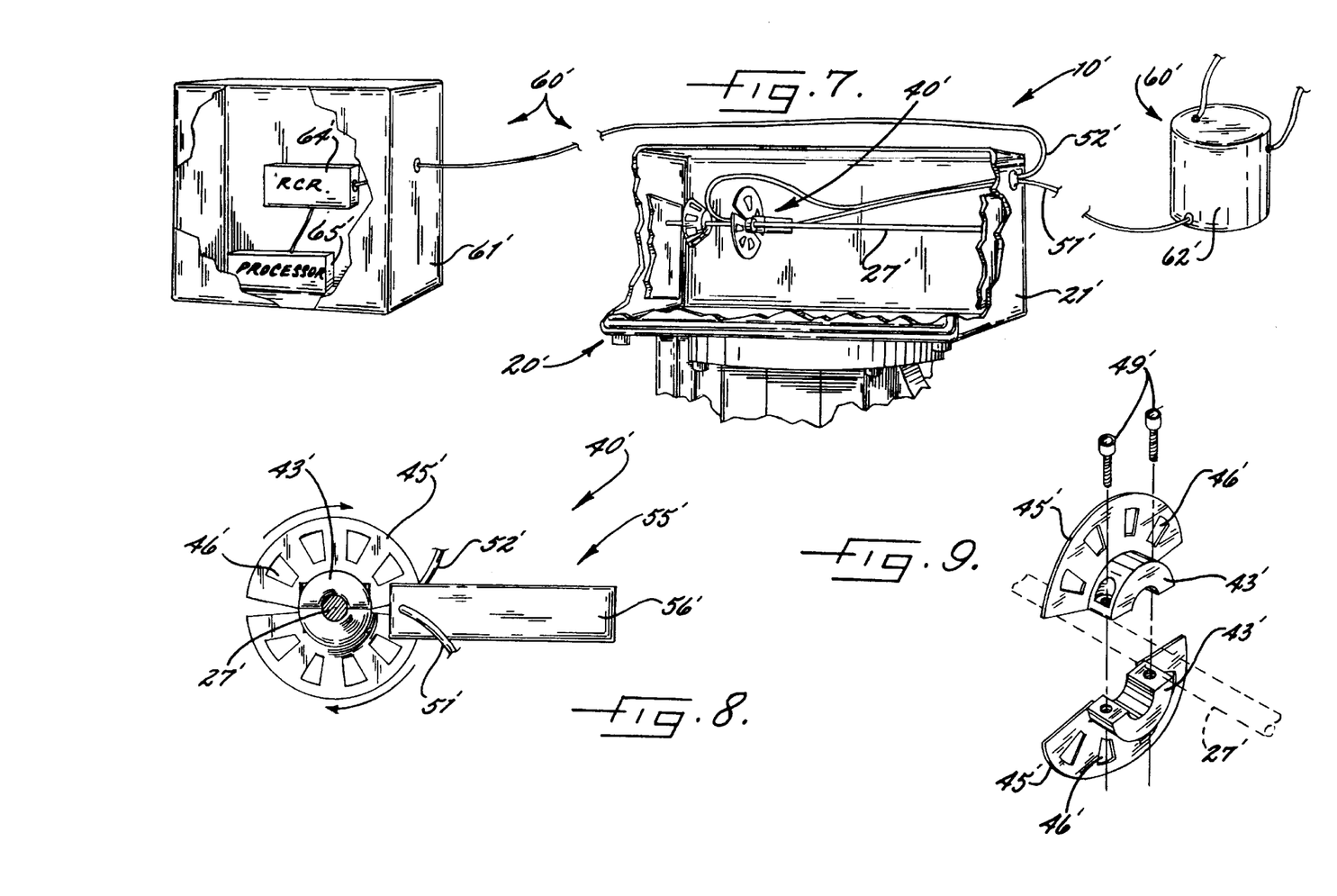
FIG. 7 is fragmentary perspective view of an explosive fluid immune data metering apparatus according to another embodiment of the present invention.
FIG. 8 is a side elevational view of an immune data converter of an explosive fluid metering apparatus according to another embodiment of the present invention.
FIG. 9 is an exploded perspective view of an immune data converter of an explosive fluid metering apparatus according to another embodiment of the present invention.

FIGS. 7–9 illustrate another embodiment of an explosive fluid metering apparatus 10' according to the present invention. This embodiment of an apparatus 10', for example, uses pressurized air or other types of fluid in either an open or a closed system, e.g., hydraulic liquids or gases in a closed system, for detecting rotation or movement of the rotatable shaft 27' and to thereby provide immune data communications. For brevity and conciseness, this details which are similar to the first embodiment of the apparatus 10 as described above will not be repeated herein.

This embodiment of the apparatus 10' also illustrates the use of closed-ended openings or apertures as indicators 46' instead of open-ended slots as illustrated in the first embodiment of the rotatable disc member 42'. The closed-ended openings, for example, can be beneficial where vibration is a concern such as in heavy industrial environments in which many of these retrofitable meters 20' are found. The pressurized air or gas preferably is supplied from an air or gas source 62' which pumps or inputs air into the tubing 51'. Likewise, another piece of tubing 52' can advantageously be positioned in positional alignment with the distal end of the first tubing 51' so as to receive and thereby detect, e.g., by a pressure sensor or receiver 64' and a controller or processor 65' positioned in a housing 61' such as illustrated.

As illustrated in FIGS. 1–9 and as described above, the present invention also advantageously includes methods of metering explosive fluid. A method of metering explosive fluid according to the present invention preferably includes connecting an explosive fluid meter 20 in fluid communication with an explosive fluid distribution pipe 15. The explosive fluid meter 20 has a housing 21 and explosive fluid metering means 25 positioned within the housing 21 for metering explosive fluid. The explosive fluid metering means 25 includes a rotatable shaft 27. The method also includes mounting an immune data converter 40 to the rotatable shaft 27, rotating the shaft 27 responsive to explosive fluid being distributed from the explosive fluid distribution pipe 15, and converting the rotation of the shaft 27 into optical data communication representative of the amount of explosive fluid being distributed.

The immune data converter 40 of the method preferably includes first and second disc member portions 41, 44 (see FIGS. 4–6). The step of mounting the immune data converter 40 to the shaft 27 preferably includes detachably connecting the first disc member portion 41 to the second disc member portion 44 so that the rotating disc member 42 is detachably connected to the rotatable shaft 27. The method can also advantageously include controlling the optical communication to and from the immune data converter 40.

A method of converting the rotation of a shaft 27 of explosive fluid meter into optical communication according to the present invention preferably includes mounting a rotatable disc member 42 to the shaft 27. The rotatable disc member 42 preferably has a hub 43 for mounting the disc member to the shaft 27 and a plate member 45 connected to the hub 43 and extending outwardly therefrom. The plate member 45 has a plurality of indicators 46 formed in a surface thereof. The method also includes mounting a pair of spaced-apart light pipes 51, 52 positioned so that the indicators 46 of the plate member 45 extend between the pair of spaced-apart light pipes 51, 52 and so that optical pulses are formed during rotation of the shaft 27 and the rotatable disc member 42 connected thereto.

The rotatable disc member 42 of the method preferably includes first and second disc member portions 41, 44. The step of mounting the rotatable disc member 42 to the shaft 27 includes detachably connecting the first disc member portion 41 to the second disc member portion 44 so that the rotating disc member 42 is detachably connected to the rotatable shaft 27. The method can also include controlling the optical pulses representative of optical communication to and from the pair of light pipes 51, 52. The step of controlling the optical pulses preferably includes emitting light through one of a pair of light pipes 51, 52, receiving light from the other of the pair of light pipes 51, 52, and processing the light representative of optical communication at least received from the other of the pair of light pipes 51, 52.

A method of converting an explosive fluid meter 20 for optical communication is also provided according to the present invention. The method preferably includes opening a housing 21 of an explosive fluid meter 20 and mounting an immune data converter 40 to a rotatable shaft 27 positioned within the housing 21 of the explosive fluid meter 20. The rotation of the shaft 27 is converted into optical data communication representative of the amount of explosive fluid being distributed.

The step of mounting an immune data converter 40 preferably includes mounting a rotatable disc member 42 to the shaft 27. The rotatable disc member 42 has a hub 43 for mounting the disc member to the shaft 27 and a plate member 45 connected to the hub 43 and extending outwardly therefrom. The plate member 45 includes a plurality of indicators 46 formed in a surface thereof. The method also includes mounting a pair of spaced-apart light pipes 51, 52 positioned so that the indicators 46 of the plate member 45 extend between the pair of spaced-apart light pipes 51, 52 and so that optical pulses are formed during rotation of the shaft 27 and the rotatable disc member 42 connected thereto.

The rotatable disc member 42 preferably includes first and second disc member portions 41, 44. The step of mounting the rotatable disc member 42 to the shaft 27 includes detachably connecting the first disc member portion 41 to the second disc member portion 44 so that the rotating disc member 42 is detachably connected to the rotatable shaft 27. The method can also include controlling the optical pulses representative of optical communication to and from the pair of light pipes 51, 52. The step of controlling the optical pulses includes emitting light through one of a pair of light pipes 51, 52, receiving light from the other of the pair of light pipes 51, 52, and processing the light representative of optical communication received from the other of the pair of light pipes 51, 52.

Because the explosive fluid metering apparatus 10 and methods of the present invention advantageously use optical communication which does not include any electrical components which can potentially ignite explosive fluid fumes, explosive fluid residue, or explosive fluid itself, the integrity of an explosive fluid metering system is maintained so that the system continues to effectively inhibits explosions or fires. An explosive fluid metering apparatus 10 and methods of the present invention advantageously is relatively inexpensive, relatively easy to manufacture and install, and less complicated than other systems.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed is:

1. An explosive fluid metering apparatus for metering explosive fluid and for readily retrofitting an existing explosive fluid meter, the apparatus comprising:

an explosive fluid distribution pipe for distributing explosive fluid;

an explosive fluid meter in fluid communication with said explosive fluid delivery pipe, said explosive fluid meter including a housing devoid of electric circuits which can cause explosive fluid to ignite and explosive fluid metering means positioned within said housing for metering explosive fluid and being devoid of electric circuits which can cause explosive fluid to ignite, said housing including a light pipe opening positioned to extend therethrough, said explosive fluid metering means including a rotatably mounted shaft rotatable responsive to explosive fluid being distributed from said explosive fluid distribution pipe; and immune data converting means positioned within said housing of said explosive fluid meter, connected to said rotatably mounted shaft, and being devoid of electric circuits which can cause explosive fluid to ignite for converting the rotation of said shaft into immune data communication which is immune from causing explosive fluid to ignite and immune from interference caused by electromagnetic forces associated with said explosive fluid meter, said immune data converting means including a rotatable disc member connected to said shaft, positioned in fluid exposure to explosive fluid and having a plurality of indicators formed in a surface thereof and at least one light pipe having a distal end positioned adjacent the rotatable disc member and having more proximal portions extending outwardly through said light pipe opening so that optical pulses responsive to the plurality of indicators are communicated remote from said housing of said explosive fluid meter, said rotatable disc member also having first and second disc member portions and at least one fastener for detachably connecting said first member portion to said second member portion so that said rotating disc member is readily detachably connected to said rotatable shaft to thereby readily retrofit the explosive fluid meter.

2. An apparatus as defined in claim 1, wherein said rotatable disc member further includes a hub defined by at least portions of said first and second disc member portions and detachably mounted to said shaft and a plate member mounted to said hub and extending outwardly therefrom, said plate member including the plurality of indicators formed in a surface thereof, and wherein the at least one light pipe comprises a pair of spaced-apart light pipes positioned so that the indicators of said plate member extend between said pair of spaced-apart light pipes so that optical pulses are formed during rotation of said shaft and said rotatable disc member connected thereto.

3. An apparatus as defined in claim 2 wherein said immune data converting means further comprises light pipe mounting means connected to each of said pair of light pipes for mounting said pair of light pipes in a spaced-apart arrangement.

4. An apparatus as defined in claim 3, herein said light pipe mounting means includes at least one mounting bracket connected to an inner surface of said housing, said at least one mounting bracket including a bracket body and an elongate slot having an open end thereof formed in said bracket body, said pair of spaced-apart light pipes being connected to opposing sides of said elongate slot, said elongate slot being positioned so that the indicators of said plate member of said rotatable disc member extend through at least portions of said slot and so that said pair of spaced-apart light pipes sense the presence and absence of the indicators.

5. An apparatus as defined in claim 2, wherein said first and second disc member portions comprise first and second halves of said rotatable disc member, each of said first and second halves including a half portion of said hub and a half portion of said plate member so that the joining of said first and second halves respectively define said hub and said plate member.

6. An apparatus as defined in claim 5, further comprising immune data controlling means positioned remote from said explosive fluid meter housing and connected to said pair of light pipes for controlling the optical communication to and from said pair of light pipes.

7. An apparatus as defined in claim 6, wherein said immune data controlling means includes an optical emitter positioned in optical communication with one of said pair of light pipes for emitting light through the one of said pair of light pipes, an optical receiver positioned in communication with the other of said pair of light pipes for receiving light therefrom, and processing means positioned in communication with said optical receiver for processing the optical communication received from the other of said pair of light pipes.

8. An explosive fluid metering immune data converting apparatus adapted to be positioned within a housing of an existing explosive fluid meter devoid of electric circuits which can cause explosive fluid to ignite and to be connected to a rotatable shaft positioned within the housing for readily retrofitting and converting the rotation of the shaft into optical data communication which is immune from causing explosive fluid to ignite and immune from interference caused by electromagnetic forces associated with the explosive fluid meter, the apparatus comprising:

a rotatable disc member positioned to be mounted to the shaft positioned within a housing of the explosive fluid meter and in fluid exposure to an explosive fluid, said rotatable disc member including first and second disc member portions, at least one fastener for detachable connecting said first member portion to said second member portion, a hub defined by at least portions of said first and second member portions and positioned to be mounted to the shaft, and a plate member mounted to said hub and extending outwardly therefrom so that said rotating disc member is readily detachably connected to said rotatable shaft to thereby allow ready retrofitting capabilities, said plate member including a plurality of indicators formed in a surface thereof; and a pair of spaced-apart light pipes positioned so that the indicators of said plate member extend between said pair of spaced-apart light pipes so that the optical pulses are formed during rotation of the shaft and said rotatable disc member connected thereto.

9. An apparatus as defined in claim 8, further comprising light pipe mounting means connected to each of said pair of light pipes for mounting said pair of light pipes in a spaced-apart arrangement.

10. An apparatus as defined in claim 9, wherein said light pipe mounting means includes at least one mounting bracket connected to an inner surface of said housing, said at least one mounting bracket including a bracket body and an elongate slot having an open end thereof formed in said bracket body, said pair of spaced-apart light pipes being connected to opposing sides of said elongate slot, said elongate slot being positioned so that the indicators of said plate member of said rotatable disc member extend through at least portions of said slot and so that said pair of spaced-apart light pipes sense the presence and absence of the indicators.

11. An apparatus as defined in claim 10, wherein said first and second disc member portions comprise first and second halves of said rotatable disc member, each of said first and second halves including a half portion of said hub and a half portion of said plate member so that the joining of said first and second halves respectively define said hub and said plate member.

12. An apparatus as defined in claim 11, wherein the housing of the explosive fluid meter has a light pipe opening formed therein, and wherein said pair of spaced-apart light pipes have the respective distal ends thereof positioned adjacent said rotatable disc member within the housing and have more proximal portions thereof extending through said light pipe opening so that optical pulses responsive to the indicators are communicated remote from the housing of the explosive fluid meter.

13. An apparatus as defined in claim 12, further comprising immune data controlling means positioned remote from said explosive fluid meter housing and connected to said pair of light pipes for controlling the optical communication to and from said pair of light pipes.

14. An apparatus as defined in claim 13, wherein said immune data controlling means includes an optical emitter positioned in optical communication with one of said pair of light pipes for emitting light through the one of said pair of light pipes, an optical receiver positioned in communication with the other of said pair of light pipes for receiving light therefrom, and processing means positioned in communication with said optical receiver for processing the optical communication received from the other of said pair of light pipes.

15. An apparatus as defined in claim 14, wherein said plate member of said rotatable disc member has a generally circular shape, wherein said hub is connected to a medial portion of said plate member, and wherein the indicators in a surface of said plate member of said rotatable disc member comprise a plurality of open ended slots formed in said plate member and extending inwardly from outer peripheries thereof.

16. An apparatus as defined in claim 15, wherein each of said first and second halves of said hub include a semi-circular shaped groove arranged to be positioned on a circularly-shaped shaft so that when said first and second halves of said hub are joined together on the shaft said hub substantially surrounds the shaft.

17. A method of retrofitting and converting the rotation of a shaft of an existing explosive fluid meter into optical communication which is immune from causing explosive fluid to ignite and immune from interference caused by electromagnetic forces associated with the explosive meter, the existing explosive meter including a housing devoid of electric circuits which can cause explosive fluid to ignite, the method comprising the steps of:

mounting a rotatable disc member to the shaft of the explosive fluid meter in fluid exposure to an explosive fluid, the rotatable disc member including first and second disc member portions, at least one fastener for detachable connecting said first member portion to said second member portion, a hub defined by at least portions of said first and second disc members for mounting the disc member to the shaft, and a plate member connected to the hub and extending outwardly therefrom, the plate member including a plurality of indicators formed in a surface thereof; and mounting a pair of spaced-apart light pipes positioned so that the indicators of the plate member extend between the pair of spaced-apart light pipes and so that optical pulses are formed during rotation of the shaft and the rotatable disc member connected thereto.

18. A method as defined in claim 17, wherein the step of mounting the rotatable disc member to the shaft includes detachable connecting the first disc member portion to the second disc member portion so that the rotating disc member is detachable connected to the rotatable shaft.

19. A method as defined in claim 18, further comprising controlling the optical pulses representative of optical communication to and from the pair of light pipes.

20. A method as defined in claim 19, wherein the step of controlling the optical pulses includes emitting light through one of a pair of light pipes, receiving light from the other of the pair of light pipes, and processing the light representative of optical communication received from the other of the pair of light pipes.

* * * * *